United States Patent [19]

McVaugh

[11] 4,385,862
[45] May 31, 1983

[54] REEL LOADER

[76] Inventor: Arthur K. McVaugh, 2009 Old Sumneytown Pike, Harleysville, Pa. 19438

[21] Appl. No.: 294,351

[22] Filed: Aug. 19, 1981

[51] Int. Cl.³ .............................................. B60P 1/48
[52] U.S. Cl. .................................. 414/555; 414/546; 414/911
[58] Field of Search ............... 414/546, 555, 911, 680, 414/684, 722, 729, 738; 242/86.5 R

[56] References Cited

U.S. PATENT DOCUMENTS 4,091,946  5/1978  Kraeft et al. .................... 414/455 X
4,354,793 10/1982  Perry .................................. 414/546

Primary Examiner—Robert G. Sheridan
Attorney, Agent, or Firm—Paul & Paul

[57] ABSTRACT

A truck-mounted articulated mechanism for loading and unloading cable reels onto and from a flatbed mobile truck, comprises a pair of lift arms, one on each side of the truck, pivotally movable, by hydraulic rams, about a transverse shaft mounted in the free ends of a pair of transfer arms which are pivotable about pivot pins fixed in the truck frame. This mechanism lifts and lowers the cable reel between ground and the rearward end of the bed of the vehicle. Locking mechanisms, actuable by hydraulic pistons, lock the axle of the cable reel in a recess in each of the lift arms during the lifting and lowering operations. The pivotal transfer arms, one on each side of the truck, actuable by hydraulic rams, transfer the cable reel, while its axle is still locked in the recesses of the lift arms, between the rearward end and the forward end of the flatbed truck. A locking mechanism, actuable by hydraulic pistons, lock the axle of the cable reel in its storage position at the forward end of the truck. A second reel may be lifted and lowered by the lift arms between ground and a storage position at the rearward end of the truck. The transverse shaft means include a pair of concentric tubular torsion shafts, one inside the other, and having a common axis, for assuring that the pivotal movements of the lift arm and transfer arm on each side of the truck are in synchronism and alignment.

10 Claims, 6 Drawing Figures 4,385,862

REEL LOADER

BACKGROUND OF THE INVENTION

The present invention relates to truck-mounted mechanisms for lifting and lowering heavy cable reels between the ground and a first position at the rearward end of a flatbed truck, and for transferring the cable reel between the rearward position and a forward position on the truck for storage and transportation. A second cable reel may be lifted and lowered between the ground and a position at the rearward end of the truck. Such a truck makes it unnecessary to use a separate trailer for transporting the cable reels.

Pertinent prior art patents includes Hall, U.S. Pat. Nos. 3,184,082; Hall, 3,902,612; and Kraeft, 4,091,946.

SUMMARY OF THE INVENTION

A principal object of the invention is to provide an improved truck-mounted hydraulically-operated mechanism for lifting and lowering heavy cable reels between the ground and a first position at the rearward end of a flatbed transport truck, for transferring the cable reel between the first rearward position and a second position at the forward end of the truck, for locking the axle of the cable reel at the forward position, and for lifting and lowering a second reel between the ground and a position at the rearward end of the truck.

The foregoing object is achieved by providing a truck-mounted articulated mechanism which includes, on each side of the truck, a transfer arm pivotal about a pivot pin located at a fixed position on the truck frame, and a lift arm pivotal about a pivot shaft located at the outward or free end of the transfer arm, and recess means at the outward end of the lift arm for receiving and capturing the axle of a cable reel, such mechanism being capable of lifting a heavy cable reel from the ground and placing it at a first position on the bed of a flatbed truck at the rearward end and then transferring the cable reel to a second position at the forward end while the cable-reel axle is still captive in the lift-arm recess.

DETAILED DESCRIPTION OF THE PREFERRED EMBODIMENTS

Figure 2:
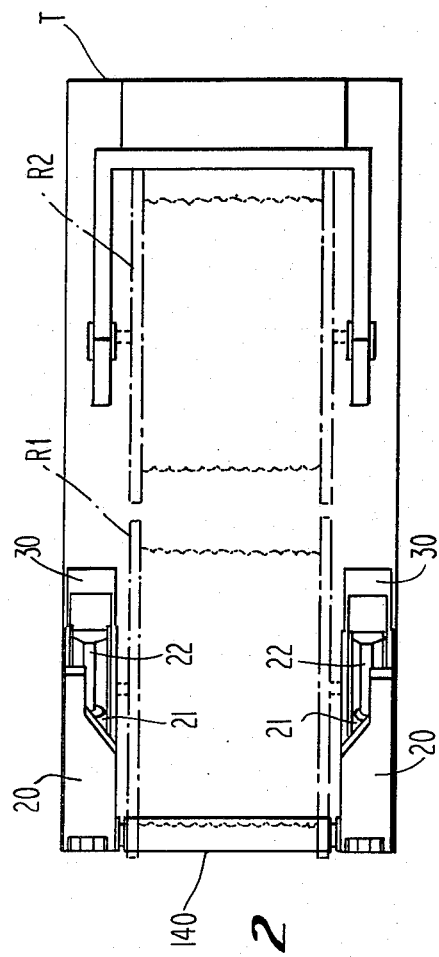
FIG. 2 is a top plan view looking down along the line 2—2 of FIG. 1.
Figure 1:
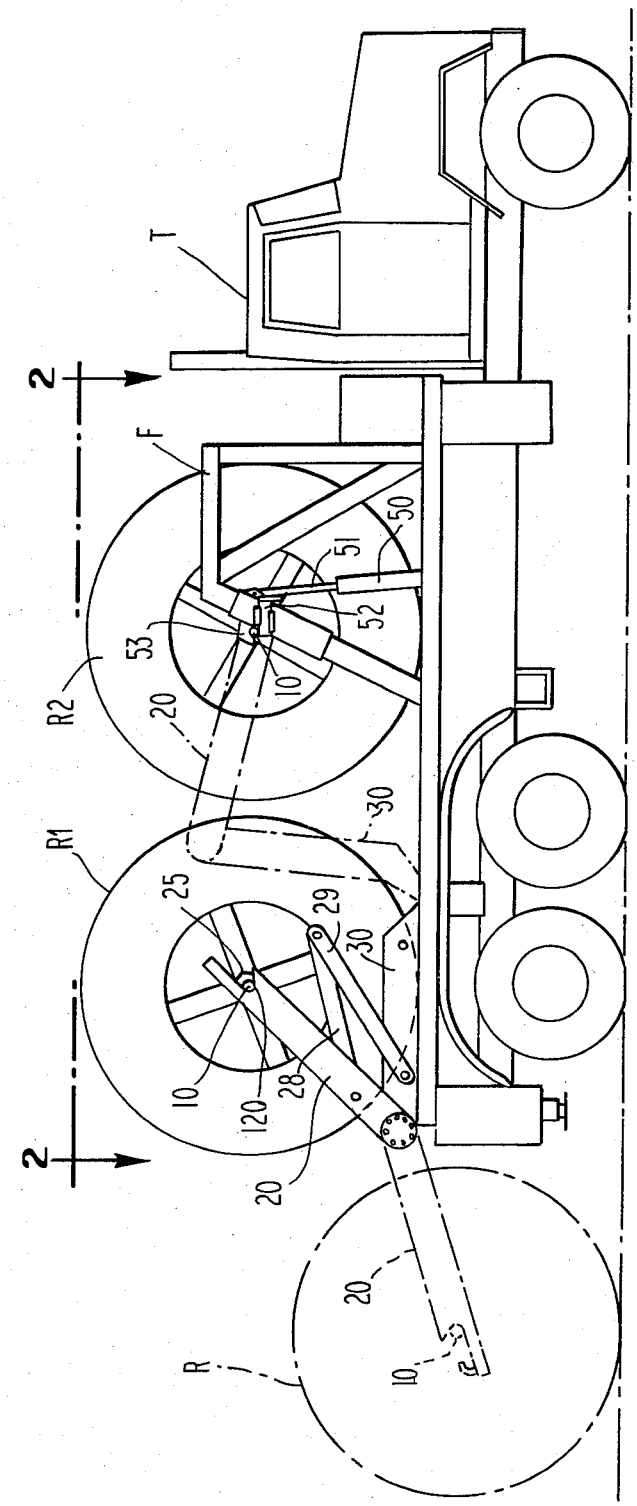
FIG. 1 is a side elevational view of a flatbed truck having a cable-reel handling mechanism according to the present invention.

Referring now to FIG. 1, there is shown a flatbed truck T adapted to store and to transport two cable reels, one at the forward end of the truck, identified R2, and the other at the rearward end, identified R1.

Assuming the truck T to be empty of cable reels, the truck is backed to the position, or the cable reel R is rolled on the ground to the position, indicated in phantom by the reel R. Reel R is then lifted by a pair of hydraulically-actuated lift arms 20, one on each side of the truck, from its position on the ground to the position identified R1 at the rearward end of the flatbed truck. The cable reel, while still held by the lift arms 20, is then transferred by a pair of hydraulically-actuated transfer arms 30, one at each side of the truck, to the position R2 at the forward end of the flatbed truck. The axles of the two reels occupying the positions R1 and R2 are then locked in position for transportation on the truck.

Figure 3:
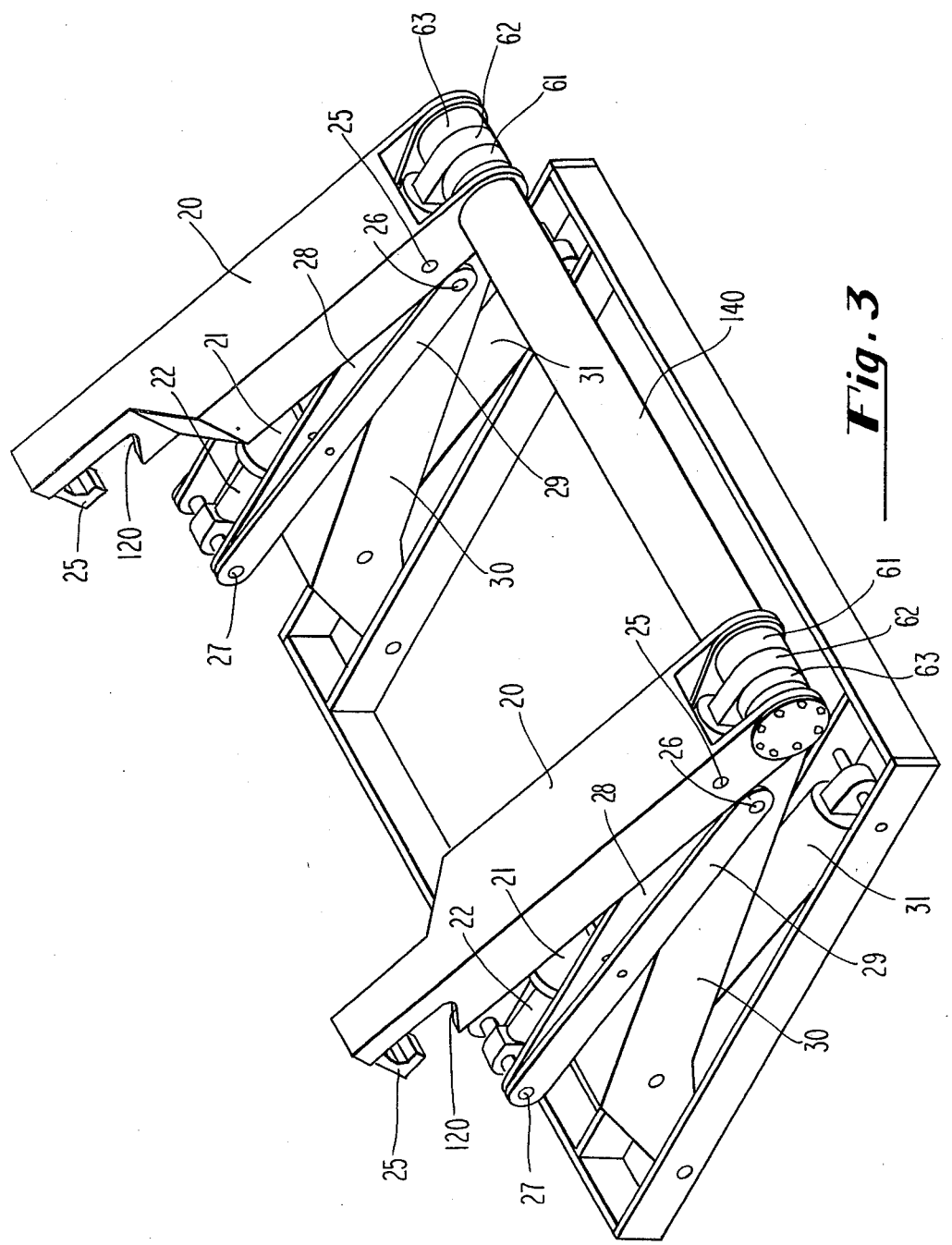
FIG. 3 is a perspective view of the mechanism in closed or folded condition.

FIG. 3 is a perspective view of the lifting and transfer mechanism shown in closed position. The pair of lift arms 20 are pivotally mounted on a tubular torsion shaft 40 which extends transversely across the truck. A pair of hydraulic rams, each comprising a cylinder 21 and a piston 22, control the positions of the lift arms 20. In the closed or folded position of the mechanism illustrated in FIG. 3, the pistons 22 are fully extended. A second pair of hydraulic rams, each comprising a cylinder 31 and a piston 32, control the positions of the transfer arms 30. The pistons 32 are not visible in FIG. 3 but may be seen in FIG. 4.

Figure 4:
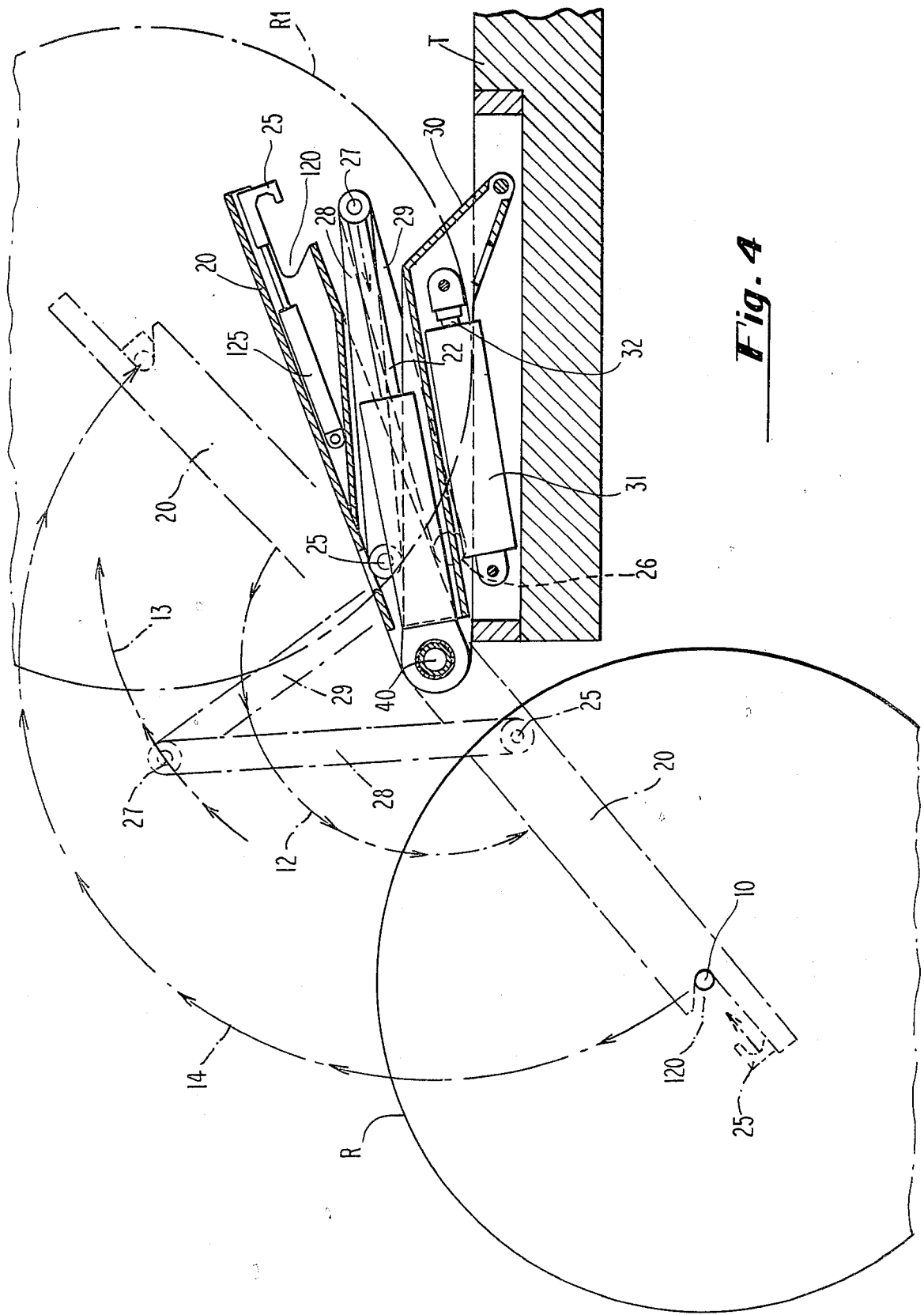
FIG. 4 is a side elevational view, in section, at the rear of the truck showing the cable reel in solid line on the ground an in phantom in its position after it has been lifted onto the rear of the vehicle.

Reference is now made to FIG. 4 which shows, in phantom, one of the pair of lift arms 20 in its fully open position ready to lift the cable reel R. Before actuating the pair of lift arms 20 to lift the cable reel R, a locking mechanism in the form of a slidingly movable hook 25 is actuated, by hydraulic means 125 to lock the axle 10 of the cable reel R in a recess 120 in each of the lift arms 20.

When the lift arms 20 are in the fully open position shown in phantom in FIG. 4, the pistons 22 are fully retracted. Pistons 22 are connected to pivot pin 27 but for drawing clarity are not illustrated in the fully open position of lift arm 20 in FIG. 4. To have reached the fully open position, each lift arm 20 is moved by its piston 22 from the solid line position shown in FIG. 4 counterclockwise about torsion shaft 140 as indicated by the arrows of the smaller diameter arc 12.

To cause the pair of lift arms 20 to lift the cable reel R, the arms 20 are moved clockwise in the direction of the arrows of the larger diameter arc 14. This is done by causing the hydraulic cylinders 21 to extend the pistons 22.

Figure 6:
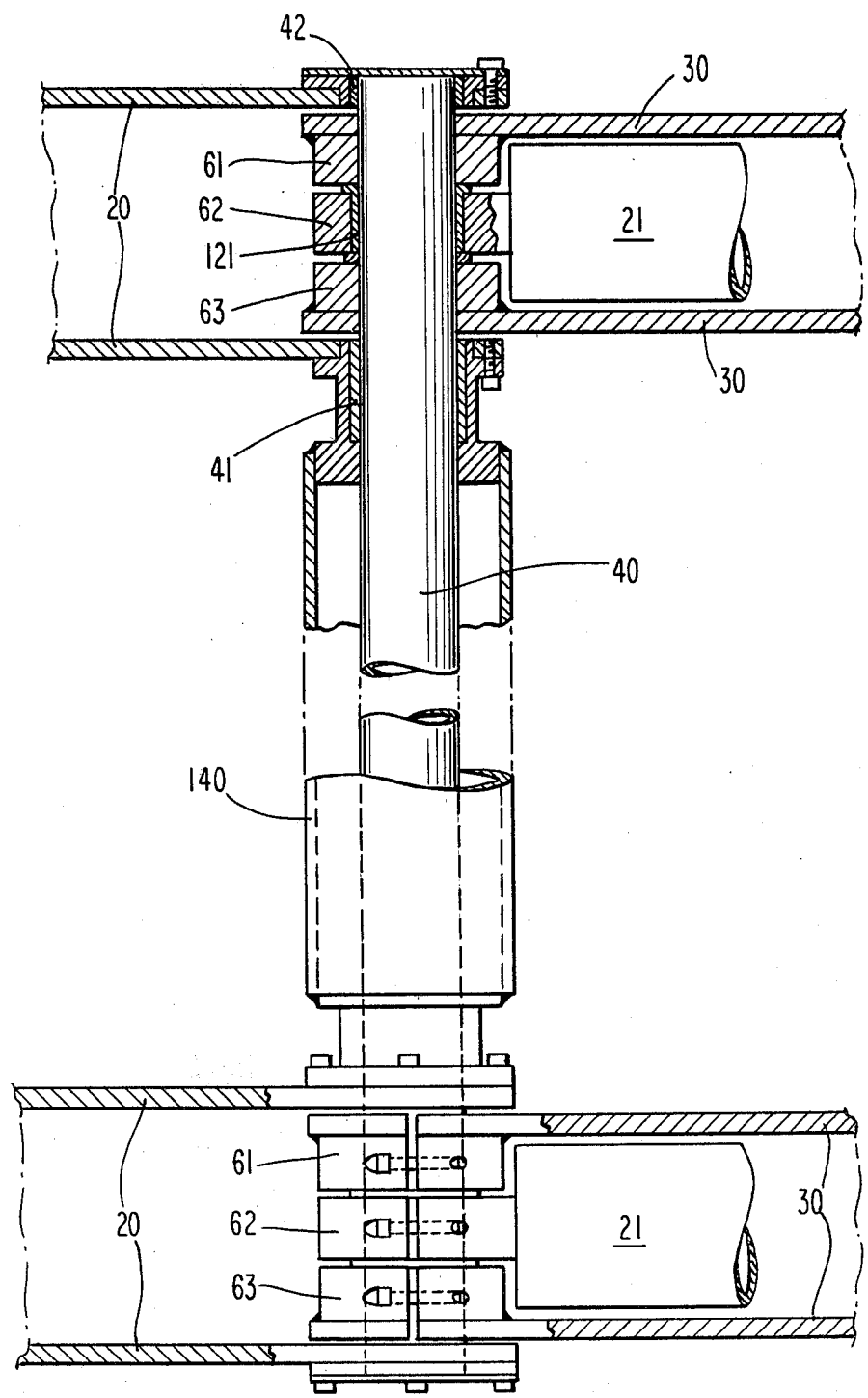
FIG. 6 is a view, partly in section, of the transverse concentric torsion shafts which support the lift arms and transfer arms and insure that the arms of each pair move in unison, without lag or lead relative to each other.

As seen in FIGS. 3 and 4, and in greater detail in FIG. 6, one end of each of the pair of cylinders 21 is mounted on a tubular torsion shaft 40 which is concentric and within another tubular torsion shaft 140. The end of each of the pistons 22 is mounted on a pivot pin 27 which interconnects the common ends of two sets of link arms 28 and 29. As seen best in FIG. 3, there is one set of link arms 28,29 on each side of piston cylinder 21. This arrangement is repeated on the opposite side of the mechanism, as seen clearly in FIG. 3. Thus, there is a total of four sets of link arms 28,29, two sets on each side of the truck. The inward ends of the link arms 28 are connected pivotally to the lift arms 20, at pivot points 25. The inward ends of the link arms 29 are connected pivotally to the transfer arms 30, at pivot points 26.

In FIG. 4, as already stated, to avoid undue confusion of lines, the lift arm cylinder 21 and its piston 22 are not shown for the fully open position of lift arm 20. However, as already described, the lower end of the cylinder 21 is mounted on the inner tubular torsion shaft 40, as seen in detail in FIG. 6, and the end of the piston 22 is connected to the pivot pin 27, as seen in the solid-line closed position in FIG. 4. In the solid-line position shown in FIG. 4, the piston 22 is extended, whereas in the dotted-line open position, the piston 22 is retracted.

When, starting with the fully open position of lift arms 20 shown in phantom in FIG. 4, the pistons 22 are caused to move in an extending direction, the pivot pins 27, one on each side of the mechanism, move in a clockwise direction along a path having as its center pivot point 26, said path being indicated by the dot-and-dash arrowed line 13 in FIG. 4. This pulls the lift arms 20 from the open or lowered outward position shown in phantom in FIG. 4 to the partially-closed upper position shown in phantom in FIG. 4, thereby lifting the reel R from the ground position shown in solid line to the position R1 shown in phantom. The reel now rests on the flatbed truck at the rearward end thereof.

Figure 5:
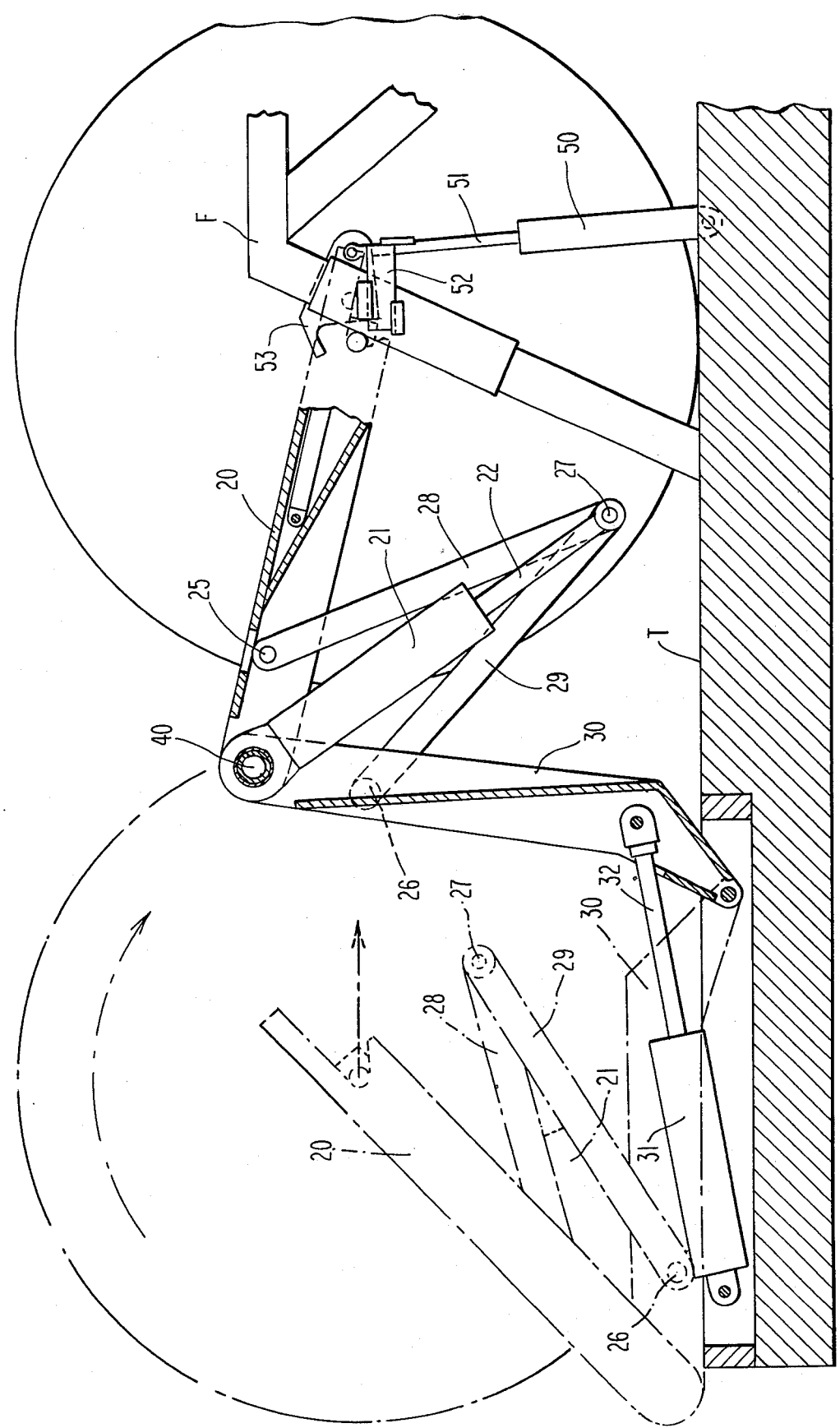
FIG. 5 is an elevational view, in section, showing the cable reel in phantom at the rearward end of the truck and in solid line at the forward end of the truck after it has been transferred from the rearward to the forward end by the transfer mechanism.

Referring now to FIG. 5, when the position R1 is reached, as just described, the transfer pistons 32 are driven in an outward or extending direction by the transfer cylinders 31, one on each side of the truck. This lifts the transfer arms 30 one on each side of the mechanism, from their folded positions shown in phantom in FIG. 5 to the upright positions shown in solid line in FIG. 5. In so doing, the transfer arms 30 pivot about pivot pins 33 fixed in the frame of truck T.

Since the inner torsion shaft 40 is mounted on and carried by the free ends of the transfer arms 30, when the transfer arms 30 are moved to the upright position shown in solid line in FIG. 5, the torsion bar 40 is carried to the elevated position shown in FIG. 5, and the lift arms 20, one on each side of the mechanism, are carried by the concentric tubular torsion shafts 40,140 from the position shown in phantom in FIG. 5 to the position shown in solid line. This moves the reel from the rearward position R1 shown in phantom in FIG. 5 to the forward position R2 shown in solid line in FIG. 5. The manner in which the lift arms 20 are mounted on the torsion shafts 40,140 is shown in detail in FIG. 6 and will be described later.

When the reel arrives at the position R2 at the forward end of the truck bed, a pair of hydraulic cylinders 50, one on each side of the truck, are actuated to extend pistons 51 thereby camming a pair of slidable locking blocks 52, one on each side of the mechanism, to the left, as viewed in FIG. 5, and causing the latching keepers 53 to pivot counterclockwise, whereby the keepers 53 capture opposing ends of the axle 10 of the cable reel and latch it in position. The slide lock blocks 52 and the keeper 53 are mounted on a rigid frame member F which is provided at the forward end of the truck.

FIG. 6 shows in some detail how the pair of lift arms 20, one on each side of the mechanism, and the pair of transfer arms 30, one on each side the mechanism, are mounted and how they are connected together by the tubular torsion shafts 140 and 40, respectively, so that the pivotal movement of each arm of the pair tracks substantially exactly with the other arm of the pair, i.e., so that there is no lag or lead between the corresponding lift arms, or between the corresponding transfer arms, on the two sides of the mechanism as they are moved pivotally during the lifting and lowering operations of the cable reel.

As seen in FIG. 6 the transfer arms 30 are mounted on the inner-tubular torsion shaft 40 and so clamped thereto by clamp 61 and 63 that there is no relative movement between the shafts 40 and the transfer arms 30. Cylinders 21 are also mounted on inner-shaft 40 but the mounting is by means of sleeve bushings 121 to allow relative movement between shaft 40 and cylinder 21. Lift arms 20 are mounted on torsion shaft 40 by way of bushings 41 and 42 to allow for relative movement between the lift arm 20 and the torsion shaft 40. Tracking between the two lift arms of the pair, one on each side of the mechanism, is achieved by tieing the two arms together by means of an outer tubular torsion shaft 140 which is supported on the inner shaft 40 by means of the sleeve bushings 41.

What is claimed is:

1. Truck mounted mechanism for transferring heavy cable reels between ground and either one of two positions on the bed of a flat bed truck, one at the rearward end and the other at the forward end of the truck, said mechanism comprising:
   a. articulated means on each side of the truck comprising first and second arms, the inward end of said first arm and the outward end of said second arm being pivotally interconnected together to form an articulated joint;
   b. the inward end of said second arm being pivotal about a pivot pin fixed to said truck;
   c. the outward end of said first arm being adapted to be connected to the axle of a cable reel;
   d. first and second links having their inward ends pivotally interconnected together, the outward end of said first link being pivotally connected to said first arm and the outward end of said second link being pivotally connected to said second arm;
   e. first hydraulic ram means connected between the pivotally interconnected inward ends of said links and the pivotally interconnected inward end of said first arm and outward arm of said second arm;
   f. a second hydraulic ram means connected pivotally between said second arm and a pivotal point fixed on said truck;
   g. whereby by actuation of said first hydraulic ram means a cable reel may be lifted from ground to a position at the rearward end portion of said truck and whereby by subsequent activation of said second hydraulic ram means, said cable reel may be transferred from the rearward to the forward end portion of said truck without disconnecting said reel from said first arm.

2. Apparatus according to claim 1 wherein transverse shaft means interconnect the articulated joints on each side of said truck.

3. Apparatus as in claim 2 wherein said tansfer shaft means comprises two concentric tubular shafts, an inner shaft and an outer shaft.

4. Apparatus according to claim 3 wherein said first arm on each side of said truck is supported on said inner shaft but interconnected by said outer shaft.

5. Apparatus according to claim 4 wherein said second arm on each side of said truck is mounted on said inner shaft and interconnected by said inner-shaft.

6. Apparatus according to claim 1 wherein said first arm is provided with a recess and a slide latch at its outward end.

7. Apparatus according to claim 6 wherein hydraulic piston means are provided for actuating said slide latch.

8. Apparatus as in claim 1 wherein a frame is provided at the forward end of said truck and latch means comprising a slide block and a keeper are mounted on said frame on each side of said truck for receiving the axle of a cable reel when transferred to the forward end position on said truck, and hydraulic cylinder and piston means operatively associated with said latch means to lock said cable reel in forward storage position.

9. Truck mounted apparatus for lifting and lowering cable reels onto and from the bed of a flatbed truck, and for transferring such reels between first and and second positions on said truck bed, said apparatus comprising:
  a. a pair of lift arms, one on each side of said truck, each lift arm having a recess at its outward end portion for receiving one end of the axle of a cable reel;
  b. transverse shaft means interconnecting the inward ends of said lift arms;
  c. a pair of transfer arms, one on each side of said truck;
  d. said transverse shaft means also interconnecting the inward ends of said transfer arms;
  e. four pairs of link arms, two pairs on each side of said truck, one end of the arms of each pair being connected pivotally together at a common pivot point, one free end of each pair of link arms being connected to said lift arm, the other free end of each pair being connected to said transfer arm, the common point ends of said link arms being interconnected by a pivot pin;
  f. a first pair of hydraulic rams, one on each side of said truck, each comprising a cylinder and a piston connected between said transverse shaft means and said pivot pin at the common point ends of link arms; and
  g. a second pair of hydraulic rams, one on each side of said truck, each comprising a cylinder and a piston connected between a fixed pivot point on said truck and a pivot point on said transfer arm.

10. Apparatus according to claim 9 wherein hydraulically operated locking means are provided for locking the axle of the cable reel in said recess.

* * * * *